Patented Feb. 26, 1952

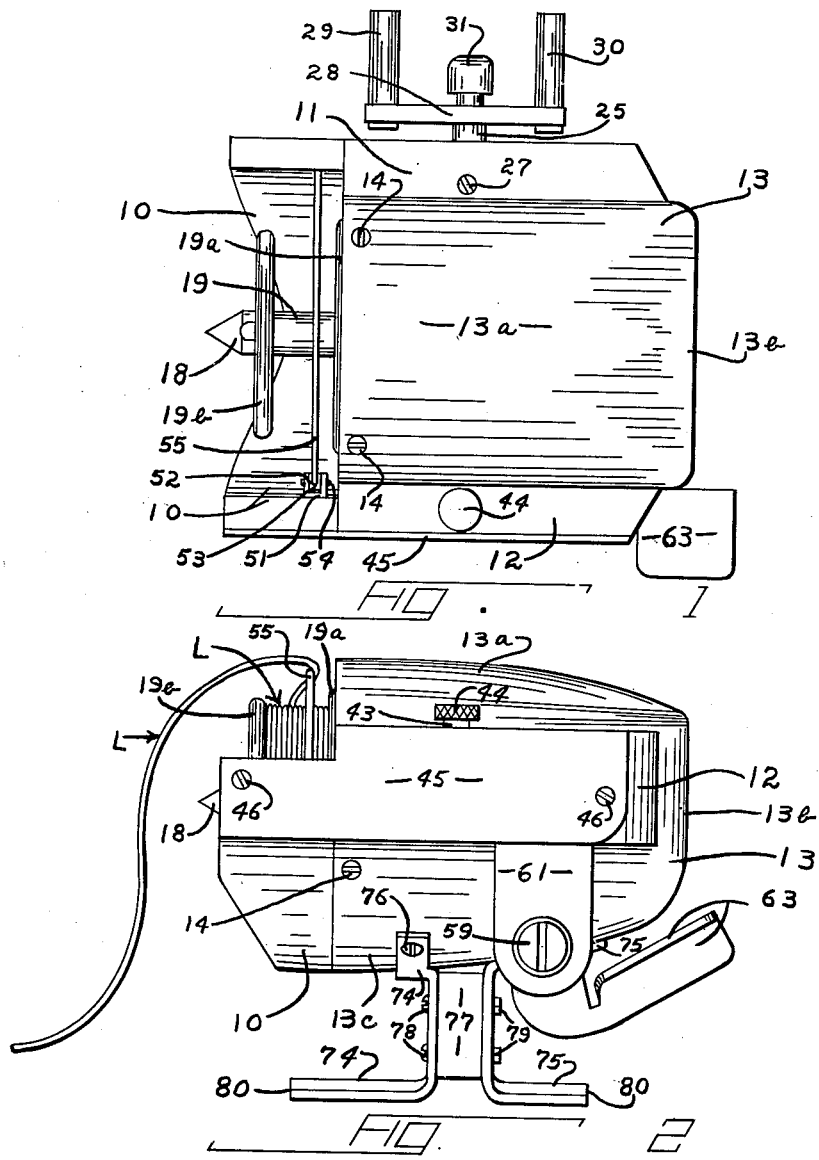

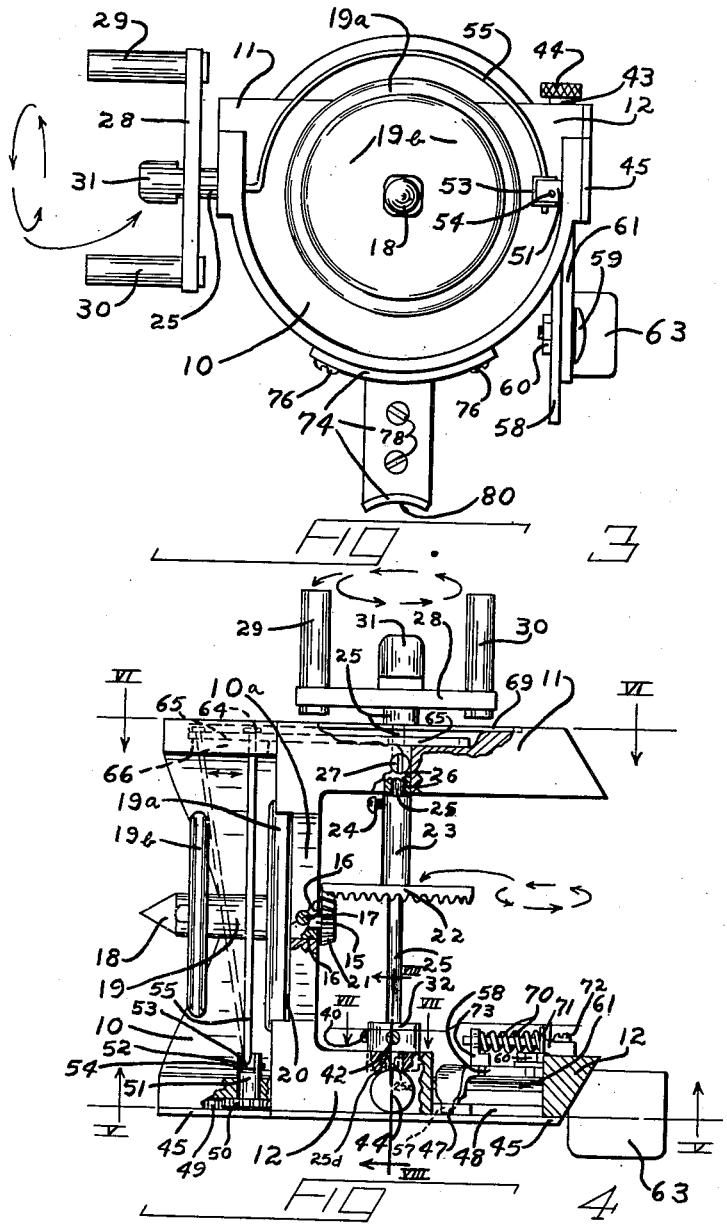

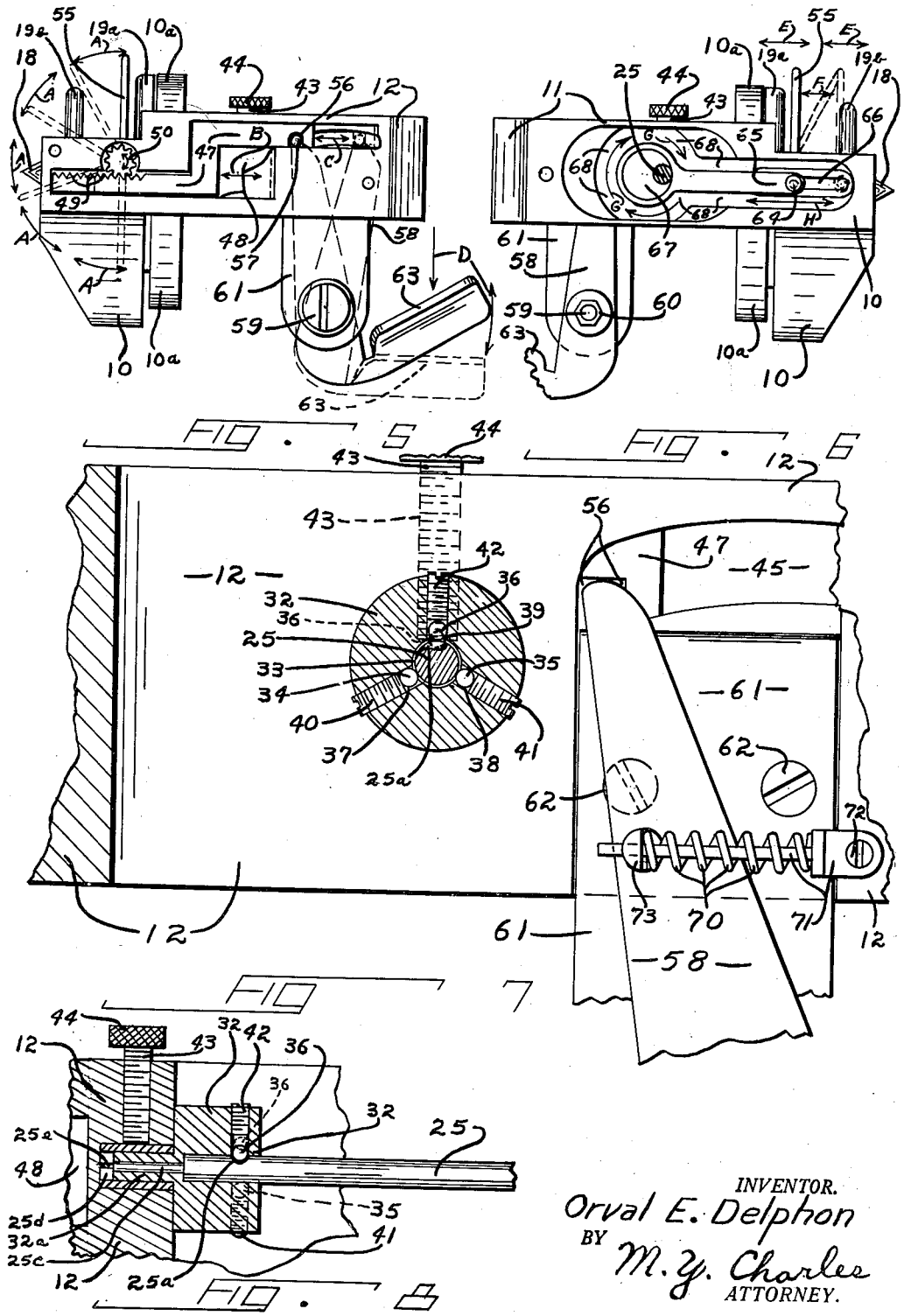

2,586,921

UNITED STATES PATENT OFFICE 2,586,921

FISHING LINE REEL DEVICE

Orval E. Delphon, Wichita, Kans.

Application August 29, 1949, Serial No. 112,915

5 Claims. (Cl. 242—84.4)

My invention relates to an improvement in mechanical reels for attachment to fishing rods. The object of my invention is to provide a fishing reel of the kind mentioned that will entirely eliminate backlash and the tangling up of the fishing line.

Another object of my invention is to provide a fishing reel of the kind mentioned that will wind the fishing line evenly on the spool as the fishing line is wound up.

A further object of my invention is to provide a fishing reel of the kind mentioned that is easily attached to any fishing rod and can be operated easily with one or both hands.

A still further object of my invention is to provide a fishing reel of the kind mentioned that is light in weight and durable in construction, neat in appearance and can be made of aluminum, plastic or any other suitable material.

Now referring to the accompanying drawings in which similar numerals of reference designate the same parts throughout the several figures of the drawings; Fig. 1 is a top plan view of the fishing reel device.

Fig. 2 is a side view of the fishing reel device.

Fig. 3 is a front view of my fishing reel device.

Fig. 4 is a top plan view of my fishing reel device, the rear case portion being removed to more clearly show some of the working parts of the fishing reel, also some parts of the fishing reel device are broken away for the purpose of illustrating some hidden parts more clearly.

Fig. 5 is a side view of my fishing reel device as shown in Fig. 4, one side plate being removed to clearly illustrate how one part is constructed, this view being as seen from the line V—V in Fig. 4 and looking in the direction of the arrows.

Fig. 6 is also a side view of my fishing reel device but is the other side from the one seen in Fig. 5, the plate on this side is shown as being removed to clearly illustrate how this portion of my device works, this view being as seen from the line VI—VI in Fig. 4 and looking in the direction of the arrows.

Fig. 7 is an enlarged detail sectional view of a portion of my fishing reel device, this view clearly illustrates this portion of my fishing reel device, the view being as seen from the line VII—VII in Fig. 4 and looking in the direction of the arrows.

Fig. 8 is an enlarged detail cross sectional view of a portion of my fishing reel device, this view clearly illustrates this portion of my fishing reel device, the view being as seen from the line VIII—VIII in Fig. 4 and looking in the direction of the arrows.

In the drawings is seen a forward housing portion 10 that is especially shaped to receive all the necessary parts which will later be explained. The forward housing portion 10 is provided with two rearwardly extending elements 11 and 12 that are an integrally formed part thereof. A second housing portion 13 is designed to fit snugly around and onto the forward housing portion 10 and is securely held in place by a plurality of screws 14. The second housing 13 is comprised of a top 13a, back 13b, and bottom 13c. A spool shaft 15 is inserted through a bronze bushing 16 that is securely held at the centermost point of the circular element 10a of the forward housing 10 by a screw 17. The forward end of the spool shaft 15 is provided with a tapered nut 18 that securely holds in rigid revolvable position, a spool 19 to receive the fishing line L and store it for use in fishing. The spool 19 has two ends, the rear end 19a is larger in diameter than the forward end 19b. The rear end 19a is received in part by a cut out portion 20 of the circular element 10z of the forward housing 10 as clearly shown in Fig. 4 of the drawings. The purpose of the rear end 19z of the spool 19 setting in this cut out portion is to keep the fishing line L from getting in behind the spool end 19a and getting caught. The forward end 19b of the spool 19 is smaller in diameter to allow the fishing line to be cast off the spool easier and faster. The rear end of the spool shaft 15 is provided with a bevelled gear 21 that is rigidly mounted, preferably welded, thereto. A second and larger gear 22 is held in constant adjustable mesh with the bevelled gear 21. The gear 22 is provided with a sleeve 23 that is an integrally formed part thereof. One end of the gear sleeve 23 is provided with a set screw 24 that adjustably holds the gear 22 in constant adjustable mesh with the bevelled gear 21. The set screw 24 holds the sleeve 23 and its respective gear 22 securely on a shaft 25. One end of the shaft 25 extends through a bronze bushing 26 that is securely held in position in a hole of the rearwardly extending element 11 by a screw 27. A conventional fishing reel crank 28 with handles 29 and 30 is provided on the outer end of the shaft 25 and is securely held in place by a nut 31 that is threadably received thereon. The other end of the shaft 25 extends through a thick sleeve element 32. The thick sleeve element 32 is provided with a hole 33 that is also provided with three evenly spaced balls 34, 35 and 36 that are loosely fitted into threaded holes 37, 38 and 39 which are evenly spaced in the thick sleeve element 32.

The shaft 25 is provided with a locking ball seat 25a the purpose of this locking ball seat 25a is to lock the fishing reel device when the crank 28 is turned backwards, any one of the balls 34, 35 or 36 that is closest to the locking ball seat 25a will fall into the ball seat 25a when turned in reverse and immediately lock the mechanism, however in the forward motion the balls 34, 35 and 36 will roll easily in and out of the slot 25a.

Three set screws 40, 41 and 42 are used in the threaded holes 37, 38 and 39 to retain the balls 34, 35 and 36 in their respective hole 37, 38 or 39 to make the whole above described unit into a clutch device that will operate in a manner as previously described and will later be further described.

The shaft 25 extends on back into the rearwardly extending element 12 to a point not quite through the wall of the rearwardly extending element 12 where it ends.

A short distance before the shaft 25 ends, it is reduced in size as at 25c, and extends through a hole in the rear portion 32a of the thick sleeve element 32. This snugly fitting portion 25c and 32a makes for a good bearing at this end of the shaft 25. The rear portion 32a of the thick sleeve element 32 is snugly positioned in a bronze split bushing 25d that fits snugly in the wall 12 of the fishing reel device. The bushing 25c is split as at 25e to squeeze the outer portion of the rear portion 32a of the thick sleeve element 32 more tightly as the tension adjusting screw 43 is turned as will be readily understood as this description progresses.

Directly above and over the end of the shaft 25 is a tension adjusting screw 43 which has a knurled head 44 formed thereon. The tension adjusting screw 43 may be screwed down to exert pressure on the split bushing 25c and in so doing makes the sleeve 32a tighter and harder to turn, thus holding the clutch drum 32 tighter and harder to turn, thus holding the clutch drum 32 tighter or even locking it in the process of casting, thus anchoring the weight being cast, also the thumb screw may be loosened slightly for back drag purposes. On the outside of the rearwardly extending element 12 is mounted a plate 45 which is held in place by two screws 46. Built into the rearwardly extending element 12 and directly under the plate 45 is slide 47 that works in a matching slot 48.

The slot 48 is so constructed to allow the slide 47 to operate in its different positions freely. The forward top portion of the slide 47 is provided with a number of gear teeth 49. The gear teeth 49 are in constant mesh with another gear 50 that is an integrally formed part of a short shaft 51 that extends through a hole in the side of the forward housing 10. The forward end of the short shaft 51 is provided with a slot 52. The slot 52 receives a square block of metal 53. The square metal block 53 is held into the slot 52 by a small pin 54 which extends through matching holes in the shaft 51 and the metal block 53 alike. One end of a half circle line guide element 55 is positioned and securely and revolvably held in the metal block 53. The slide 47 extends back a short distance after the gear teeth 49 terminate, then it turns upwardly for a short distance and turns backwards again where it terminates. An inverted U-shaped slot 56 is provided near the end of the slide 47 to accommodate one end 57 of a thumb operated lever 58. The thumb operated lever 58 extends on down where it is pivoted in the center by a bolt 59 with a nut 60 threaded thereon. The bolt 59 extends through a downwardly extending support plate 61 that is securely fastened to the inside of the rearwardly extending element 12 of the forward housing 10 by two screws 62. The downwardly extending support plate terminates a short distance below the pivot point and bolt 59. The operating lever 58 is provided with an outwardly extending thumb plate 63 that can be easily reached with the thumb or finger as desired. The purpose of the above described mechanism is to operate the half circle line guide 55 in the direction of the arrows A in the Fig. 5 of the drawings. Arrows B, C and D indicate the movements of the other parts in the operation of this mechanism in Fig. 5. Now the half circle line guide 55 extends around the upper half of the device when the thumb plate 63 is not depressed. The other end 64 of the line guide 55 extends through a slot 66 into the side wall 11 of the forward housing 10 where it is connected to one end of an eccentric connecting rod 65. The eccentric connecting rod 65 extends back to and connects with an eccentric 67 that is mounted on and driven by the shaft 25 and hand crank 28. Plenty of space 68 is provided in the rearwardly extending element 11 for the operation of the eccentric and a plate 69 is positioned over the entire mechanism and held in place securely with screws. The above described eccentric mechanism operates in the direction of the arrows E, F, G and H in Fig. 6. The eccentric mechanism moves the end 64 of the half circle line guide 55 back and forth to guide the line evenly on the spool 19 as the crank 28 is turned.

Located on the inside of the rearwardly extending element 12 is a compression spring 70. The compression spring is mounted over a spring guide 71 that is movably mounted at one end by a screw 72. The other end of the spring guide 71 is inserted through a hole in a movable support element 73 that is riveted loosely into a hole in the operating lever 58. The purpose of this spring is to at all times keep the half circle line guide 55 up in the top position to wind the line L evenly on the pool 19. Only when casting is done, the thumb operated spring 70 and the half circle line guide 55 moves down out of the way to permit the line to leave the spool 19 quickly unhindered. Now securely fastened on the bottom 13c of the second housing portion 13 are two mounting brackets 74 and 75 which are held on by screws 76 and spaced apart by a metal block 77 which is held in place by the bolts 78 with nuts 79 threaded thereon. The feet of the mounting brackets are curved slightly as at 80 to fit the contour of any rod.

Now the operation of my fishing reel device is as follows. I mount the curved feet 80 onto a rod and adjust my line L to suit the job of fishing I am going to do. I adjust the tension adjusting screw 43 by the knurled head 44 to apply pressure on the bronze split bushing 25c to bind the bushing 25d on the hub 32a to resist or lock the hub 32a and the drum 32 against rotation. I then press down on the thumb plate 63 which rocks the operating lever 58 against the pressure of the spring 70 and at the same time moves the slide 47 back into the slots 48 and the gear teeth 49 revolves the gear 50 which in turn revolves the short shaft 51 and rocks the half circle line guide 55 down and out of the way of the line as shown by the arrows A in Fig. 5. Keeping my thumb on the thumb plate 63 I cast out my line, whereupon the balls 36 fall into the ball seat 25a in the shaft 25 whereupon the spool 19 will remain stationary and the pull of the weight on the fish line L will slip the line L turn after turn from the stationery spool 19, in the process of casting. The cast having been made I take my thumb off the thumb plate 63 and the pressure of the spring 70 forces the above described procedure in reverse and the half circle line guide 55 comes up in its correct position again. I grasp the handles 29 and 30 of the crank 28 to reel in my line L. As I turn the crank I turn the shaft 25 and in turn the large gear 22, which turns the tapered gear 21, which in turn turns the spool 19 to wind up the line L on the spool as the shaft 25 turns the eccentric 67, which in turn drives the eccentric connecting rod 65 in a backwards and forwards movement to carry the line guide end with it in the slot 66 to accomplish a smooth even wrap of the line on the spool. If I want more tension on my line, all I do is adjust the tension adjusting screw, turning the knurled head 44 and this is easily accomplished. The operation is ready to be repeated in the same above described manner.

Such modifications of my invention may be employed as lie within the scope of the appended claims without departing from the spirit and intention of the invention. Now having fully shown and described my invention, what I claim is:

1. In a fishing line reel device of the kind described; said device having a case, a reel shaft, said reel shaft being revolvably carried by said case, a reel spool, said reel spool having a rear and a forward flange, said reel spool being rigidly mounted on said reel shaft and having the said rear flange thereof revolvably positioned in a recess in the said case, a miter pinion, said miter pinion being rigidly mounted on the inner end of the said reel shaft and within said case, a second shaft, said second shaft passing substantially through said case and having one end thereof projecting from said case, the center axes of the two said shafts intersecting each other within said case, a crank and crank handle thereon, said crank being rigidly mounted on the outer exposed end of the second said shaft, a miter drive gear, said miter drive gear being rigidly mounted on the second said shaft and being in mesh with the said miter pinion, a clutch drum, said clutch drum having a hollow hub, said clutch drum and hub being revolvably carried by and within said case, the inner end of the second said shaft having a spindle integrally formed thereon, said second shaft and spindle being revolvably carried in the said clutch drum and hub, and means carried by said clutch drum for engaging the second said shaft for preventing rotation of the second said shaft in one direction only, a friction shoe, said friction shoe being engageable with the said clutch hub, and means for adjustably decreasing and increasing the pressure of said shoe on the said hub from nothing to effecting a complete lock against the turning of the clutch hub and drum, a fish line guide, said guide being arcuate in form and normally positioned around one side of the said reel spool, and means attached to one end of the guide for reciprocal movement of the guide from front to back of the reel spool, said means for swinging one end of the said guide being reciprocally movable from an eccentric carried by the second said shaft, and means for rocking the said guide a half turn across the reel spool for disengagement with the fish line during the operation of casting.

2. In a fishing line reel device of the kind described; the structure defined in claim 1, said means attached to one end of the said guide for swinging that end of the guide reciprocally from front to back of the reel spool being one end of an accentric shaft, the other end of said eccentric shaft being revolvably carried on the aforesaid eccentric on the second said shaft.

3. In a fishing line reel device of the kind described; the structure defined in claim 1, said means for rocking the said guide a half turn across the reel spool being a third shaft rotatably carried by said case and having the other end of the said guide mounted for universal movements in the third said shaft, a pinion on the inner end of the third said shaft and housed within said case, a combination rack gear and slide therefor, said rack gear being in mesh with the last said pinion, and lever means for reciprocally sliding said rack gear and slide, one end of said lever means being pivotally attached to the said slide and the other end of said lever means having a thumb plate thereon for rocking the said lever, and spring means associated with, and for yieldably holding the said lever, slide and rack gear in a retracted position to ultimately hold the said guide in a vertical position over the said reel spool for fish line guiding purposes.

4. In a fishing line reel divice of the kind described; the structure defined in claim 1, said means carried by said clutch drum for engaging the second said shaft being a plurality of balls each carried in a radially positioned and equally spaced apart bores in the said clutch drum and being engageable with the second said shaft, and means for retaining said balls each in their respective bore, the second said shaft having a ball clutch seat therein, the back of said clutch seat being substantially radially positioned with respect to the cross section of the second said shaft, and the bottom of the ball clutch seat being positioned substantially at right angles to the back of the said ball clutch seat so that as the second said shaft revolves in one direction, one of the said balls will be bound between the back of said seat and the side of the bore containing the ball and force or urge rotation of the clutch drum and hub in the direction of the turning of the second said shaft, and upon the reverse rotation of the second said shaft the bottom of the ball seat will lift the ball into its respective bore and permit free rotation of the second said shaft in the clutch drum and hub.

5. In a fishing line reel device of the kind described; the structure defined in claim 1, said means for adjustably decreasing and increasing the pressure of said shoe on the said hub being a screw, the said case and one end of the screw bearing against the said shoe, the other end of the said screw being exposed outside the case and having a head thereon by which the screw may be turned for shoe pressure adjusting purposes as described.

ORVAL E. DELPHON.

REFERENCES CITED

The following references are of record in the file of this patent:

FOREIGN PATENTS

| Number | Country | Date |
|---|---|---|
| 804,067 | France | July 27, 1936 |
| 828,000 | France | Feb. 2, 1938 |
| 839,627 | France | Jan. 4, 1939 |